United States Patent [19]

Roullet et al.

[11] 4,128,847

[45] Dec. 5, 1978

[54] OPTICAL READING DEVICE COMPRISING A FOCUSSING DETECTION DEVICE

[75] Inventors: Gérald Roullet; Jean-Pierre Bortuzzo, both of Paris, France

[73] Assignee: Thomson-Brandt, Paris, France

[21] Appl. No.: 735,891

[22] Filed: Oct. 26, 1976

[30] Foreign Application Priority Data

Oct. 31, 1975 [FR] France .................. 75 33465

[51] Int. Cl.² .................. G01J 1/20; H04N 5/76
[52] U.S. Cl. .................. 358/128; 179/100.3 V; 250/201
[58] Field of Search .................. 358/128; 179/100.3 V; 250/201, 204

[56] References Cited

U.S. PATENT DOCUMENTS

| | | | |
|---|---|---|---|
| 3,905,043 | 9/1975 | Frank | 360/75 |
| 3,918,071 | 11/1975 | Albrecht | 250/201 |
| 3,919,698 | 11/1975 | Bricot | 358/128 |
| 3,932,700 | 1/1976 | Snopko | 358/128 |
| 3,952,191 | 4/1976 | Tinet | 250/201 |

Primary Examiner—Bernard Konick
Assistant Examiner—Alan Faber
Attorney, Agent, or Firm—Cushman, Darby & Cushman

[57] ABSTRACT

The invention relates to the exact focussing of a light beam on a track carried by an optically readable information support. The object of the invention is to provide in an optical reading device a dichotomic focussing error detection device of which the two states correspond to the absence and to the presence of the reading signal. In the absence of the reading signal, the lens of the optical reading device is moved at a uniform speed between two limit positions by means of a triangular control signal, the position control loop of the lens being open. In the presence of the reading signal, the lens is no longer controlled by the triangular control signal, but instead by an error signal emanating from the position control loop which is then closed.

5 Claims, 2 Drawing Figures

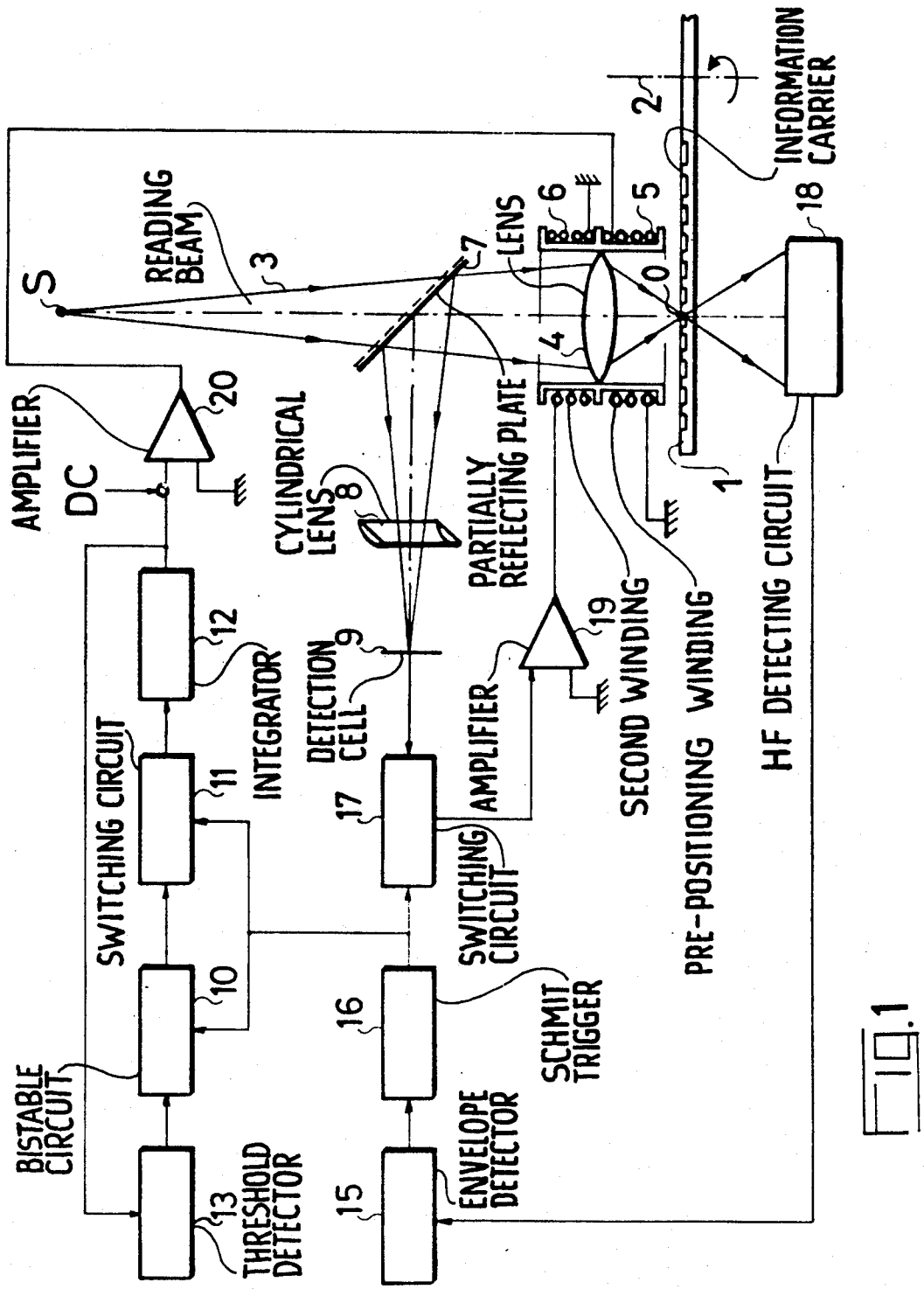

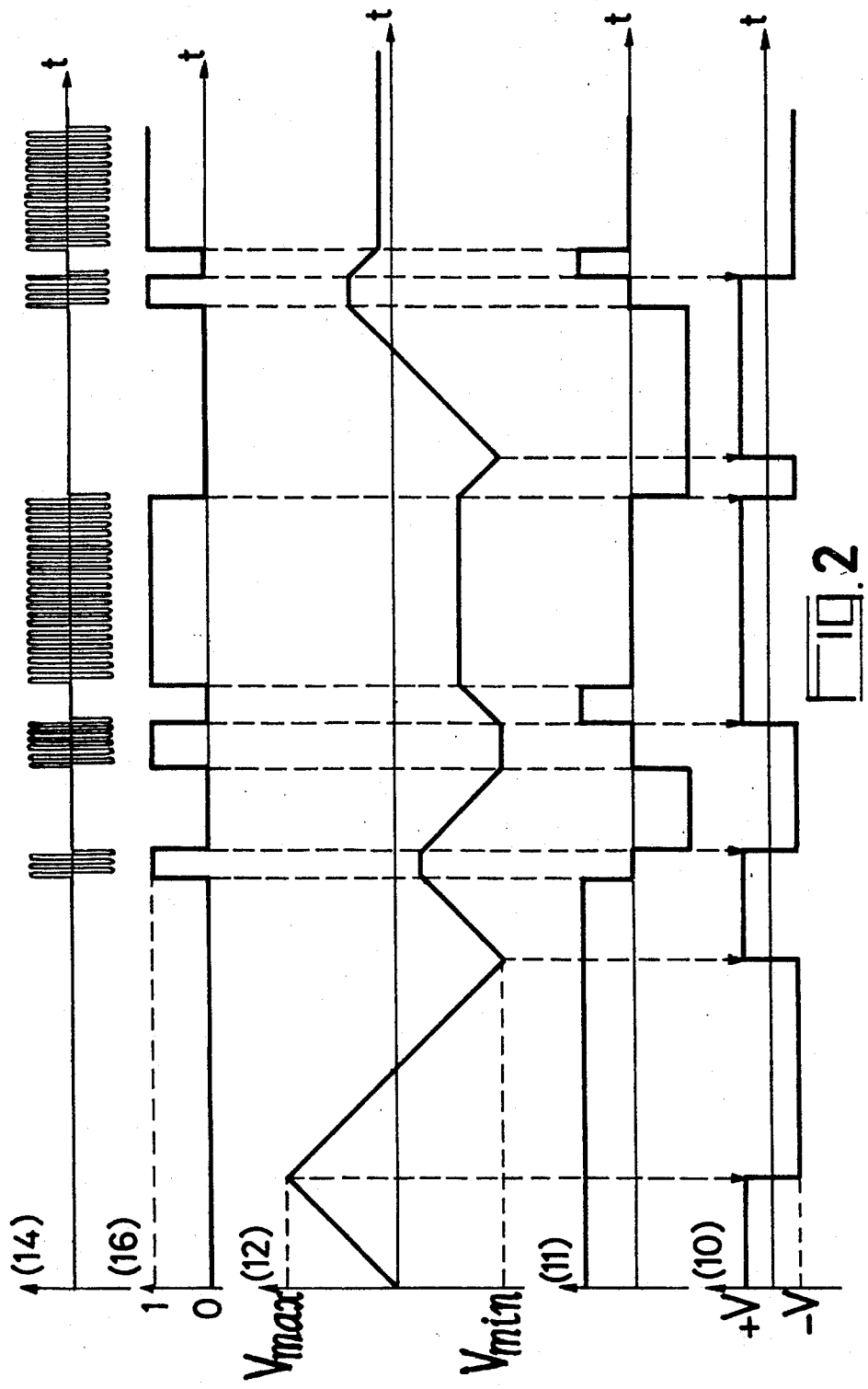

OPTICAL READING DEVICE COMPRISING A FOCUSSING DETECTION DEVICE

This invention relates to the reading of information recorded on a track carried by a moving support by means of a beam concentrated on the track.

To ensure that the reading beam is permanently concentrated on the track during reading of the support, the focussing spot of this beam has to be mobile along the axis of the beam so that it is able to follow the track because, in general, the moving support is not perfectly flat.

Movement of the reading spot along the optical axis of the reading beam may be obtained in several ways. One method is to move the reading lens along its axis, the focussing point of the reading beam moving correlatively.

One of the means capable of being used for moving the reading lens is an electromagnetic motor moving perpendicularly of the plane of the support. French patent application No. 74.41 133 relates to an improved electromagnetic motor of this type comprising a toroidal coil which, when the control loop is open, enables the reading lens to be kept in a rest position, and a solenoid through which the control signal passes when the control loop is closed.

Conventional optical reading devices comprise control devices but, because the dynamic ratio of the sensors used for measuring the focussing deviation is low, it is necessary initially to bring the reading spot into a position close to the focussed position to ensure that the control device remains stable.

This approach movement may be obtained automatically, for example by means of a control signal which always moves the lens in the same direction from a rest position to a point where the system is in the pickup zone of the control device. A system such as this has disadvantages because it involves manual intervention for returning the reading lens to its rest position when, because the speed is too high, the system has passed beyond the pickup zone.

The optical reading device according to the invention comprises a focussing detection which enables the disadvantages referred to above to be obviated. In particular, it eliminates the need for any manual intervention either for the initial approach towards the focussing zone or when the spot is out of the pickup zone of the control device in the course of reading.

According to the invention, there is provided an optical reading device, for the read-out of an information signal carried by a moving information carrier, comprising a radiation source for emitting a radiation beam having an optical axis, a focussing device for projecting said radiation beam in a focussing spot on said information carrier, first means for displacing said spot along said optical axis about a mean position and in a first range, second means for displacing said spot along said optical axis in a second range limited by two extreme positions and enclosing said first range, a position control loop comprising a first switching circuit, said loop acting upon said first displacing means for correcting variations in position occurring in said first range, a generator circuit having a control input and an output for supplying an approach signal adapted for controlling said second displacing means and a detection circuit for detecting said information signal having an output for delivering a control signal, said control signal having a first and a second state according to whether an information signal is and is not detected, said control input of said first switching circuit and said control input of said generator circuit being connected to the output of said detection circuit and respectively activated by said first and second states of said control signal.

For a better understanding of the invention and to show how the same may be carried into effect, reference will be made to the following description and the attached drawings among which:

FIG. 1 is a block diagram of the optical reading device according to the invention;

FIG. 2 is a diagram illustrating the operation of the device shown in FIG. 1.

FIG. 1 shows information carrier 1 in the form of a disc (partly shown) capable of rotating about its axis 2 for reading the track by a reading beam 3 which emanates from a source point S and which is concentrated at a point 0 by means of a lens 4. The lens 4 is able to move along the axis of the reading beam 3 and for the movement of the lens 4, the device comprises two independent windings: a first winding 5, referred to as the pre-positionning winding which is used for keeping the lens in its rest position in the absence of a carrier to be read, for detecting the focussing zone at the beginning of the reading of the carrier and for return to the pickup zone of the control device in the course of reading, and a second winding 6 which is used in the pickup zone of the control device.

In the absence of a carrier to be read, the lens 4 is kept in a rest position by means of a continuous signal "DC" applied to the input of an amplifier 20 which feeds the pre-positionning winding 5.

In normal operation, i.e. in the presence of a support to be read and with the reading spot situated in a zone close to the focussed position, a fraction of the incident beam is reflected by the support, passes through the lens 4, is reflected by a partially reflecting plate 7, passes through a cylindrical lens 8 and is detected by a detection cell 9. The electrical signal supplied by this cell 9, which is characteristic of the vertical focussing error, is applied to the input of an amplifier 19 by way of a switching circuit 17 which is thus in its closed position. The output signal of this amplifier 19 is applied to the winding 6. These various elements form the control loop which is useful when the reading spot is close to the focussing point of the reading beam. The position of the lens 4 thus follows the deviation measured so that the focussing spot follows the surface of the support.

For the pre-positionning phase of the lens during the introduction of the support for reading, a bistable circuit 10, of which the output is connected to the input of an integrator 12 by way of a switching circuit 11, supplies a signal with one or other of two amplitudes $+V$ or $-V$. The output of the integrator 12 is connected to the input of a threshold detector 13 having a lower threshold $V_{min}$ and an upper threshold $V_{max}$. When the amplitude of the output signal exceeds one of these two threshold values, the threshold detector, of which the output is connected to a control input of the bistable circuit 10, supplies a pulse which produces a change of state in the output of the bistable circuit and hence a slope inversion of the output signal of the integrator, the switching circuit 11 remaining closed. The triangular signal thus obtained at the output of the integrator 12 is superimposed upon the continuous signal DC and is amplified by the amplifier 20.

The result of this is that the lens moves about its rest position at a constant speed between two limit positions as long as the switching circuit 11 remains closed.

In the arrangement shown in FIG. 1, the actual reading operation i.e. the detection of the high-frequency signal carrying the information, is carried out by transmission by means of cells and differential amplifiers globally represented by the block 18 referred to as the HF detecting circuit. When the reading spot projected onto the support is sufficiently concentrated, the cells responsible for reading detect an HF-signal applied to the input of an envelope detector 15 which delivers the envelope of the high-frequency signal detected. The output of the envelope detector 15 is connected to the input of a Schmit trigger 16 which shapes the preceding envelope signal and supplied a signal with two levels 1 and 0 corresponding respectively to the presence and to the absence of signal read. The output of this Schmit trigger 16 is connected on the one hand to the control input of the switching circuit 11, on the other hand to the control input of the switching circuit 17 and finally to a second control input of the bistable circuit 10, for the change of state, these changes of state in the output of the bistable circuit 10 being effected on one of the edges of the output signal of the trigger, for example on the trailing edges. When the output signal of the trigger has the value 0, i.e. when no signal is detected, the switching circuit 17 is open, in other words the control loop is open, whilst the switching circuit 11 is closed, in other words the integrator 12 supplies a detection ramp.

By contrast, when the output signal of the trigger has the value 1, in other words when a signal is detected, the switching circuit 11 is open and, at the same time, the switching circuit 17 is closed, which means that the system has entered the pickup zone of the control device.

If the system leaves the pickup zone, the output signal of the trigger passes from 1 to 0 and, accordingly, the control loop is open, the switching circuit 11 is closed and the change of state in the output of the bistable circuit 10 induces a change of sense in the variation of the output signal of the integrator and, hence, a change of direction in the movement of the lens. This is particularly useful when the pickup zone has been traversed at relatively high speed and when the focussing position has been surpassed. The direction of the uniform movement of the lens is then automatically reversed.

These various situations are illustrated by the diagram in FIG. 2 which shows the signals at various points of the device. In order to simplify notation, the output signals of the various elements are denoted by the same references as these elements.

The bistable circuit 10 changes state either when the output signal of the integrator 12 reaches a threshold value or when the reading signal which was present disappears. Since the frequency of the triangular signal is of the order of 3 to 4 Hz, the reading signal may disappear from the detectors when, as a result of the inertia of the lens, the focussing zone has been surpassed. In general, this only occurs at the beginning of reading, although by reversing the slope of the ramp the device does provide for rapid return into this zone.

Since, as mentioned above, the control of the focussing detection device is associated with the detection of the signal recorded on the track, the means for approaching the focussing zone are independent of the sensor used when the control loop is closed i.e. when the reading spot is in a zone close to the focussing point of the beam. There can be no interaction within the control loop between the signal enabling the recorded zone to be detected and the error signal of the control loop, which avoids the causes of instability.

The invention is by no means limited to the embodiment which has been described and illustrated.

In particular, provided that the detection device enables a detection signal to be formed which induces a movement of the lens between two positions in the absence of a detected signal, and that in the presence of a detected signal this signal is blocked and the control loop is closed, a detection system of this kind forms part of the invention.

Finally, the optical reading device comprising a focussing detection device of this type may be designed for reading an information support by transmission or reflection of the concentrated beam, the vertical focussing error signal being obtainable in any manner, for example by means of cells situated in the same plane as the reading cells irrespective of whether the cells are intended for reading a reflecting support by reflection or for reading a support which is transparent to radiation by transmission.

What we claim is:

1. An optical reading device for the read-out of an information signal carried by a moving information carrier comprising a radiation source for emitting a radiation beam having an optical axis, a focussing device for projecting said radiation beam in a focussing spot on said information carrier, first means for displacing said spot along said optical axis about a mean position and in a first range, second means for displacing said spot along said optical axis in a second range limited by two extreme positions and enclosing said first range, a position control loop comprising a first switching circuit, said loop acting upon said first displacing means for correcting variations in position occurring in said first range, a generator circuit having a control input and an output for supplying an approach signal formed by ascending and descending ramps which act on said second displacing means for moving said spot between said two extreme positions, said generator circuit comprising a bistable circuit having a control input and an output for supplying a signal having one of two predetermined values, a second switching circuit having an input connected to the output of said bistable circuit, a control input forming the control input of said generator circuit and an output, integrator means having an input connected to the output of said second switching circuit, said control input of said bistable circuit being adapted for receiving change of state pulses when said approach signal reaches values corresponding to said extreme positions in said second range, and a detection circuit for detecting said information signal having an output for delivering a control signal, said control signal having a first and a second state according to whether an information signal is and is not detected, said control input of said first switching circuit and said control input of said generator circuit being connected to the output of said detecting circuit and respectively activated by said first and second states of said second signal.

2. An optical reading device as claimed in claim 1, wherein said bistable circuit receives change of state pulses according to the changes in value of said control signal.

3. An optical reading device as claimed in claim 2, wherein a DC voltage is permanently added to said approach signal, said DC voltage being intended to keep said focussing spot at an equal distance from said two extreme positions.

4. An optical reading device as claimed in claim 3, wherein said approach signal and said control loop act independently of one another on the movement of the spot.

5. An optical reading device as claimed in claim 1 wherein said focussing device comprises a lens, and means formed by an electrodynamic transducer comprising a mobile system with which said lens is associated, said transducer comprising two conductive windings forming said first and said second displacing means.

* * * * *